United States Patent [19]

Cusimano, II

[11] Patent Number: 5,209,793
[45] Date of Patent: May 11, 1993

[54] LOW NOISE PNEUMATIC TIRE TREAD WITH VOIDS BALANCED OVER EACH HALF TREAD REGION

[75] Inventor: Fred J. Cusimano, II, Akron, Ohio

[73] Assignee: Bridgestone/Firestone, Inc., Akron, Ohio

[21] Appl. No.: 701,427

[22] Filed: May 15, 1991

[51] Int. Cl.⁵ .............................................. B60C 11/11
[52] U.S. Cl. .................................................. 152/209 R
[58] Field of Search ............. 152/209 R, 209 A, 209 B, 152/209 D

[56] References Cited

U.S. PATENT DOCUMENTS

| | | |
|---|---|---|
| D. 279,365 | 6/1985 | Takehara . |
| D. 279,366 | 6/1985 | Takehara . |
| D. 283,501 | 4/1986 | Hitzky . |
| D. 295,398 | 4/1988 | Sedlack . |
| D. 313,211 | 12/1990 | Minamitani et al. . |
| 2,424,608 | 7/1947 | French . |
| 4,462,446 | 7/1984 | Goergen . |
| 4,484,610 | 11/1984 | Wallet et al. . |
| 4,982,775 | 1/1991 | Matsumoto ..................... 152/209 B |
| 5,002,110 | 3/1991 | Tsurunaga et al. ............. 152/209 B |

FOREIGN PATENT DOCUMENTS

| | | | |
|---|---|---|---|
| 0324605 | 7/1989 | European Pat. Off. . | |
| 0357462 | 3/1990 | European Pat. Off. . | |
| 0125902 | 6/1986 | Japan ............................. | 152/209 R |
| 0120202 | 6/1987 | Japan ............................. | 152/209 D |
| 0049505 | 3/1988 | Japan ............................. | 152/209 R |
| 0918988 | 2/1963 | United Kingdom ........... | 152/209 R |

Primary Examiner—Michael W. Ball
Assistant Examiner—Nancy T. Krawczyk
Attorney, Agent, or Firm—David A. Thomas

[57] ABSTRACT

A low noise pneumatic tire tread and method for producing same characterized by the minimization of the total amount of acoustic energy produced by a tire's tread as it rolls over a road surface by the strategic placement of grooves in a tread design such that the amount of groove void across at least one of the trailing and leading edges of the tread's footprint is substantially uniform about the circumference of the tire.

6 Claims, 6 Drawing Sheets

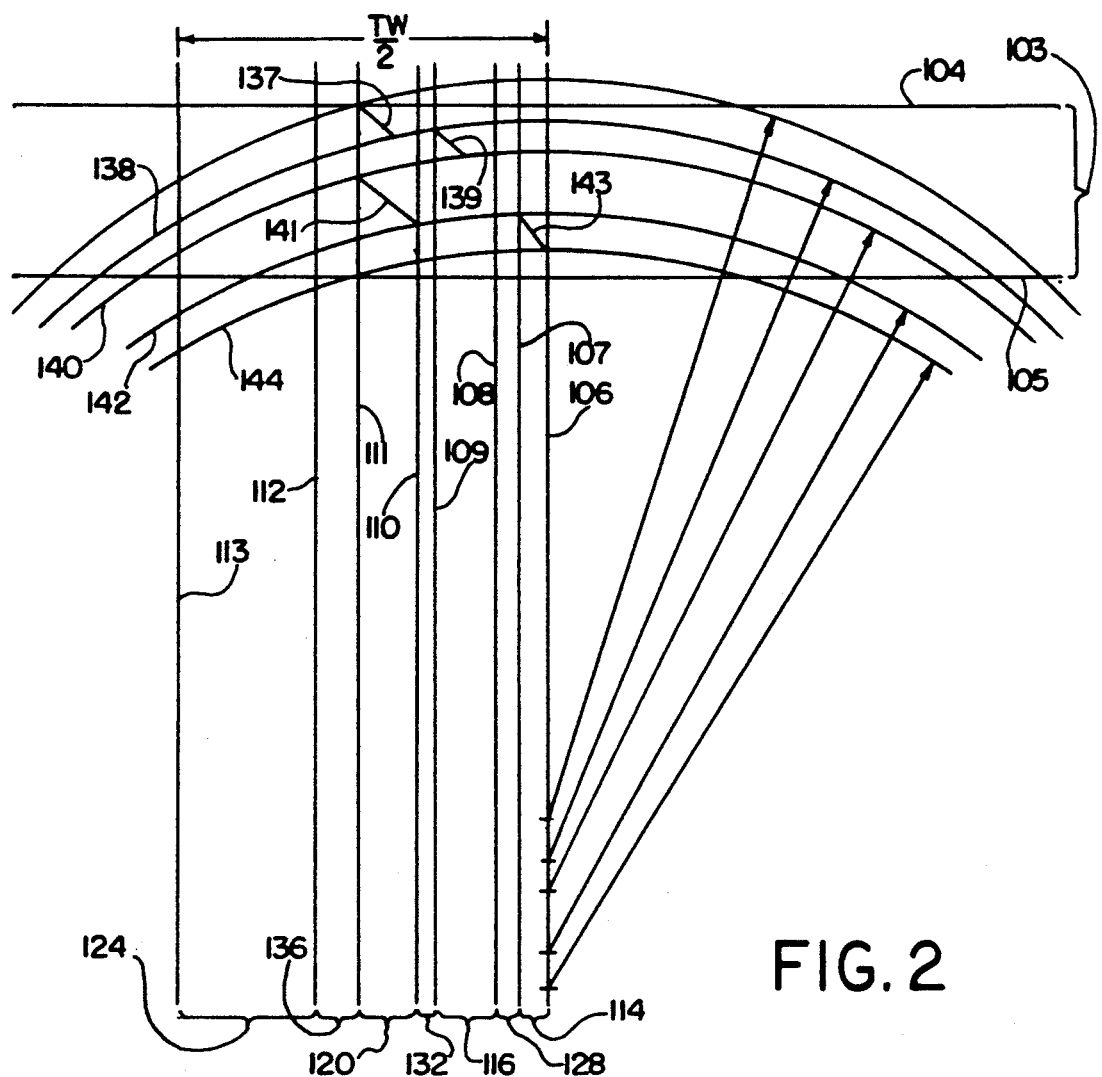

LOW NOISE PNEUMATIC TIRE TREAD WITH VOIDS BALANCED OVER EACH HALF TREAD REGION

The invention herein described relates generally to pneumatic tires and, more particularly, to a tread pattern providing improved noise performance, and to a method for producing the tread pattern.

BACKGROUND

The tread of conventional vehicle tires typically comprises a plurality of load bearing tread block elements separated by a network of grooves. The tread block elements are arranged in a pattern around the circumference of the tire. As the tire rolls over a road surface the tread block elements move into engagement with the road surface at the leading edge of the tread's footprint and out of engagement at the trailing edge of the tread's footprint. This causes disturbances in the surrounding air molecules that generate sounds. For any given tread pattern a certain amount of acoustic energy is produced. The distribution of the acoustic energy over the audio frequency spectrum has been found to be controlled at least in part by the geometry of the tread block elements. Where tread block elements of constant pitch length have been used to completely surround a tire, the sound generated is dominated by a single frequency and its harmonics, i.e., a majority of the sound generated is concentrated into a small frequency range of the audio frequency spectrum. This tonal concentration may be highly disturbing to the occupants of the vehicle on which the tire is mounted.

Much effort has been directed to the reduction of objectionable tire noise, with emphasis being placed on the spreading of the energy produced by the tire tread pattern over the audio frequency spectrum thereby to reduce objectionable tonal concentration. A technique known as "pitching" accomplishes this by varying the length, i.e., the pitch, of the design cycle of the tread of the tire around its circumference, with the result being a "variable pitch" tire tread pattern. The design cycle is a representative portion of the tread which typically comprises in the circumferential direction at least one tread block element and a generally transversely extending groove. For conditions of practical manufacture of the molds for the tires the circumference of the tire is composed of a whole number of design cycles. The lengths of the design cycles may be varied in a random or preselected algorithmic manner to distribute the audio noise throughout the frequency spectrum.

Another known noise treatment technique is phase optimization at the leading and trailing edges of the tire's footprint. This technique involves circumferential rotation of one portion of the tread pattern relative to another portion, such as, for example, one circumferential rib relative to another circumferential rib. In this manner the tread block elements extending transversely across the tread may be caused to engage and disengage the road surface in staggered relationship. Computer simulations heretofore have been used to perform phase optimization, as well as optimal pitch sequencing.

While it is advantageous to distribute the noise energy over a wide range of frequencies, a more fundamental objective is the reduction of the total amount of sound energy that needs to be modulated. If the total amount of noise is reduced, the noise at each frequency will be correspondingly reduced with the result being a quieter tire. This is accomplished in European Patent Publication No. 0 357 462 by optimizing the inclined angle of transverse grooves dividing circumferential ribs into a plurality of block elements. It was discovered that sound energy rapidly dropped when the inclined angle took certain values. The applicant hereof observed that in at least one tread design these node points corresponded to a balancing of the void across the leading edge of the tire's footprint. Applicant also observed that in a tire having only circumferential grooves and straight sided circumferential ribs (i.e., a tire theoretically having no tread element impact noise) that the void across the trailing and leading edges was constant about the circumference of the tire.

SUMMARY OF THE INVENTION

The present invention provides a tire tread and associated method that are characterized by the minimization of the total amount of acoustic energy produced by a tire's tread as it rolls over a road surface. This is attained by the strategic placement of grooves in a tread design so that the amount of groove void across at least one of the trailing and leading edges of the tread's footprint is substantially uniform or constant about the circumference of the tire, i.e., balanced. The invention is characterized by design flexibility greater than that afforded, for example, by optimizing the angle of grooves in a tread pattern, and by the minimization of the amount of acoustic energy generated by the tread.

According to a preferred embodiment of the invention, there is provided a pneumatic tire with a tread for engaging a road surface at a footprint having non-linear leading and trailing edges, the tread comprising a plurality of repeating design cycles placed continuously about the circumference of the tire. The design cycles each include a respective portion of a plurality of circumferential rows of tread block elements and grooves defining the shape of the tread block elements. Each groove commences on a projection of at least one of the leading and trailing edges at which a corresponding other one of the grooves of substantially equal or equivalent width terminates, such that the void across the leading or trailing edge is substantially balanced about the circumference of the tire. Also, at least one of the grooves in each design cycle and its corresponding groove are located respectively in different circumferential rows of tread block elements and the trailing and leading ends of relatively adjacent grooves in at least one of the circumferential rows are nonoverlapping with respect to the leading or trailing edge of the tire's footprint.

A preferred tread pattern is characterized, for example, by seven circumferential ribs separated by circumferential grooves, the circumferential ribs including a continuous center rib, two discontinuous inner intermediate ribs, two discontinuous outer intermediate ribs and two discontinuous shoulder ribs. The inner intermediate ribs are formed from angled lugs that are oppositely inclined to the mid-circumferential center plane, the outer intermediate ribs are formed from angled lugs that are angled in a direction opposite that of the angled lugs of the relatively adjacent inner intermediate rib, and the shoulder ribs are formed of angled lugs that are larger than the angled lugs of the inner and outer intermediate ribs and which are angled generally in the same direction as the angled lugs of the relatively adjacent outer intermediate rib but at a different angle to the mid-circumferential center plane.

According to another aspect of the invention, a method for producing a low noise pneumatic tire comprises the steps of designing a tread pattern for a tire with non-linear leading and trailing edges, and then producing a tire with said tread pattern, said designing step including the step of strategically placing grooves in the tread pattern so that the amount of groove void measured across at least one of the leading and trailing edges of the tire's footprint is substantially uniform about the circumference of the tire.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIGS. 2-11 are a sequence of views illustrating a preferred technique for effecting strategic placement of tread void, leading to the preferred tread of FIG. 1.

DETAILED DESCRIPTION

Figure 1:
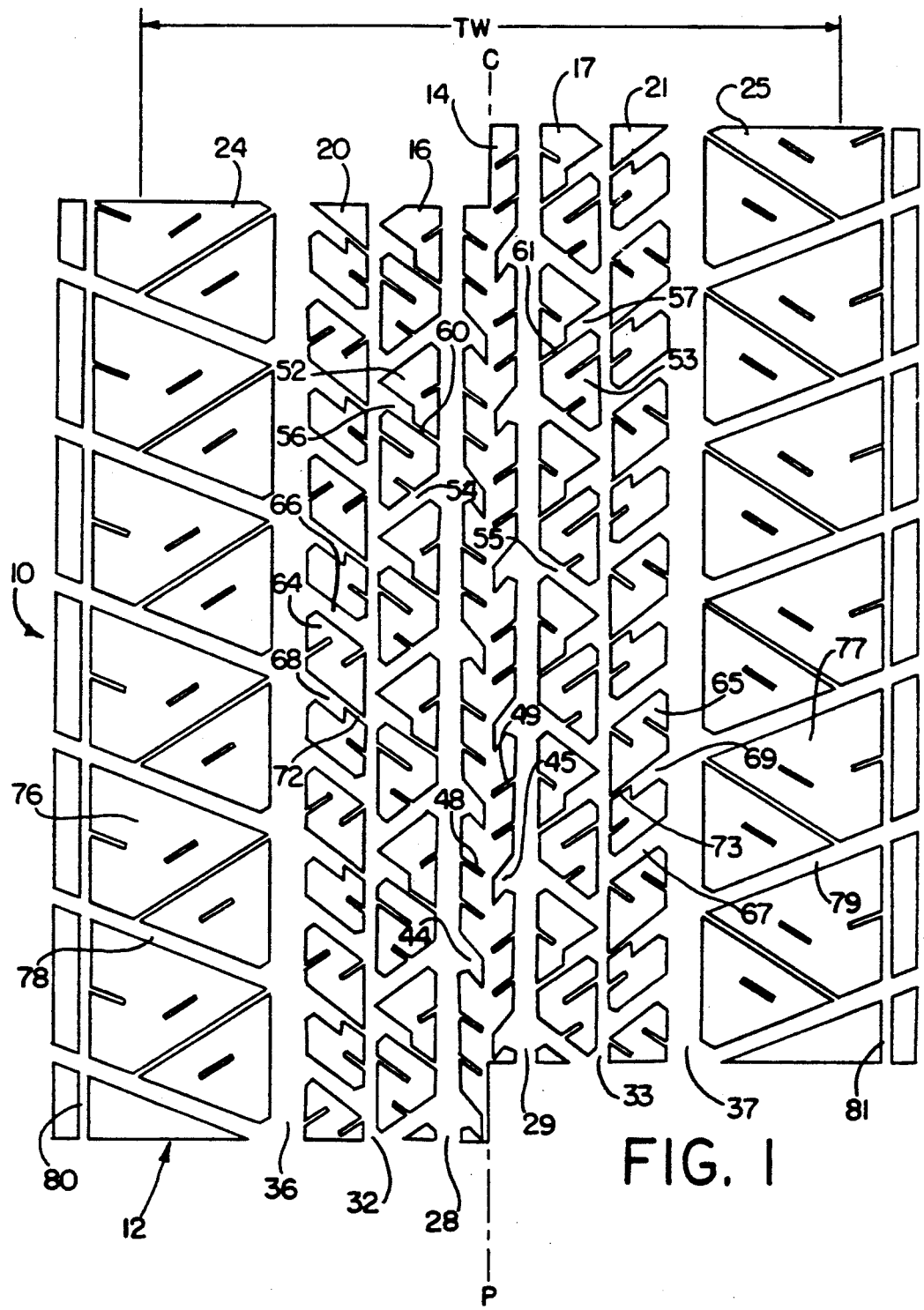
FIG. 1 is a partial plan view of a tread of a pneumatic tire constructed in accordance with the invention.

Referring now to the drawings and initially to FIG. 1, a pneumatic tire 10 can be seen in partial plan view to have an improved tread 12 according to the present invention. The tread has seven ribs consisting of a continuous center rib 14, two discontinuous oppositely directed inner intermediate ribs 16 and 17, two discontinuous oppositely directed outer intermediate ribs 20 and 21, and two discontinuous shoulder ribs 24 and 25. The center rib 14 is centered to the mid-circumferential center plane CP of the tire 10 and is separated from the inner intermediate ribs 16 and 17 by respective circumferential center grooves 28 and 29. In turn, the inner intermediate ribs 16 and 17 are separated from the outer intermediate ribs 20 and 21 by circumferential intermediate grooves 32 and 33, respectively, and the outer intermediate ribs 20 and 21 are separated from the shoulder ribs 24 and 25 by circumferential outer grooves 36 and 37, respectively. The center grooves 28 and 29 are essentially of the same width and are wider than the intermediate grooves 32 and 33 which are essentially of the same width. The outer grooves 36 and 37 are essentially of the same width and are wider than the center grooves.

The center rib 14 has offset angled as well as oppositely directed notches 44 and 45 separated by pairs of offset angled as well as oppositely directed sipes 48 and 49. Being continuous, the center rib may be viewed as a single, albeit large, tread block element bounded by the center grooves 28 and 29.

The inner intermediate ribs 16 and 17 are formed from angled tread block elements 52 and 53, that are oppositely inclined to the mid-circumferential center plane and are separated from one another by angled grooves 54 and 55. The angled block elements (which may also be referred to as lugs) each have an inwardly extending angled lateral notch 56, 57 terminating in a sipe 60, 61. Each angled block element may also have several other angled sipes extending inwardly of the block portion as shown.

The outer intermediate ribs 20 and 21 are formed from angled block elements 64 and 65 that are angled in a direction opposite that of the angled block elements 52 and 53 of the relatively adjacent one of the inner intermediate ribs 16 and 17 and are separated from one another by angled grooves 66 and 67. Like the angled block elements of the inner intermediate ribs the angled block elements (lugs) 64 and 65 each have an inwardly extending angled lateral notch 68, 69 that terminates in a sipe 72, 73 and several other angled sipes may also extend inwardly of the block portion as shown.

The shoulder ribs 24 and 25 are formed of angled block elements or lugs 76 and 77 that are considerably larger than the angled block elements of the inner and outer intermediate ribs. The block elements 76 and 77 each are angled generally in the same direction as the block elements 64 and 65 of the relatively adjacent one of the outer intermediate ribs 20 and 21 but at a different angle to the mid-circumferential center plane CP. The block elements 76 and 77 are separated from one another by angled grooves 78 and 79. A relatively narrow circumferential groove 80, 81 is positioned across the shoulder portion of each block portion 76, 77, and the block elements may also be provided with several angled sipes as shown.

A distinction is herein drawn between "grooves" and "sipes". "Grooves" are voids in the tread that do not close up when in the footprint of the tire, whereas "sipes", also referred to as "blades", are voids in the tread which close up when in the footprint of the tire. As used herein, the "footprint of the tire" refers to a footprint of a static tire when the tire is mounted on its specified rim, inflated to its recommended pressure and subjected to its rated load for the recommended inflation pressure. By way of further definition for the sake of clarity, the terms "circumferential" and "circumferentially" refer to the direction of rotation of a tire, and the terms "axial" and "axially" refer to a direction parallel to the axis of rotation of the tire. The "mid-circumferential center plane" of a tire is a plane which is perpendicular to the axis of rotation of the tire and which is located midway between the lateral (axially outer) edges of the tread in the footprint of the tire. The "tread width", also herein referred to as the "reference arc" and denoted by "TW" in FIG. 1, is the axial distance between the axially outer edges of the tread in the footprint of a tire. "Axially inwardly" means in an axial direction going from the axial edge of the tread towards the mid-circumferential center plane, and "axially outwardly" means in an axial direction going from the mid-circumferential center plane towards the axial edge of the tread.

Figure 1A:
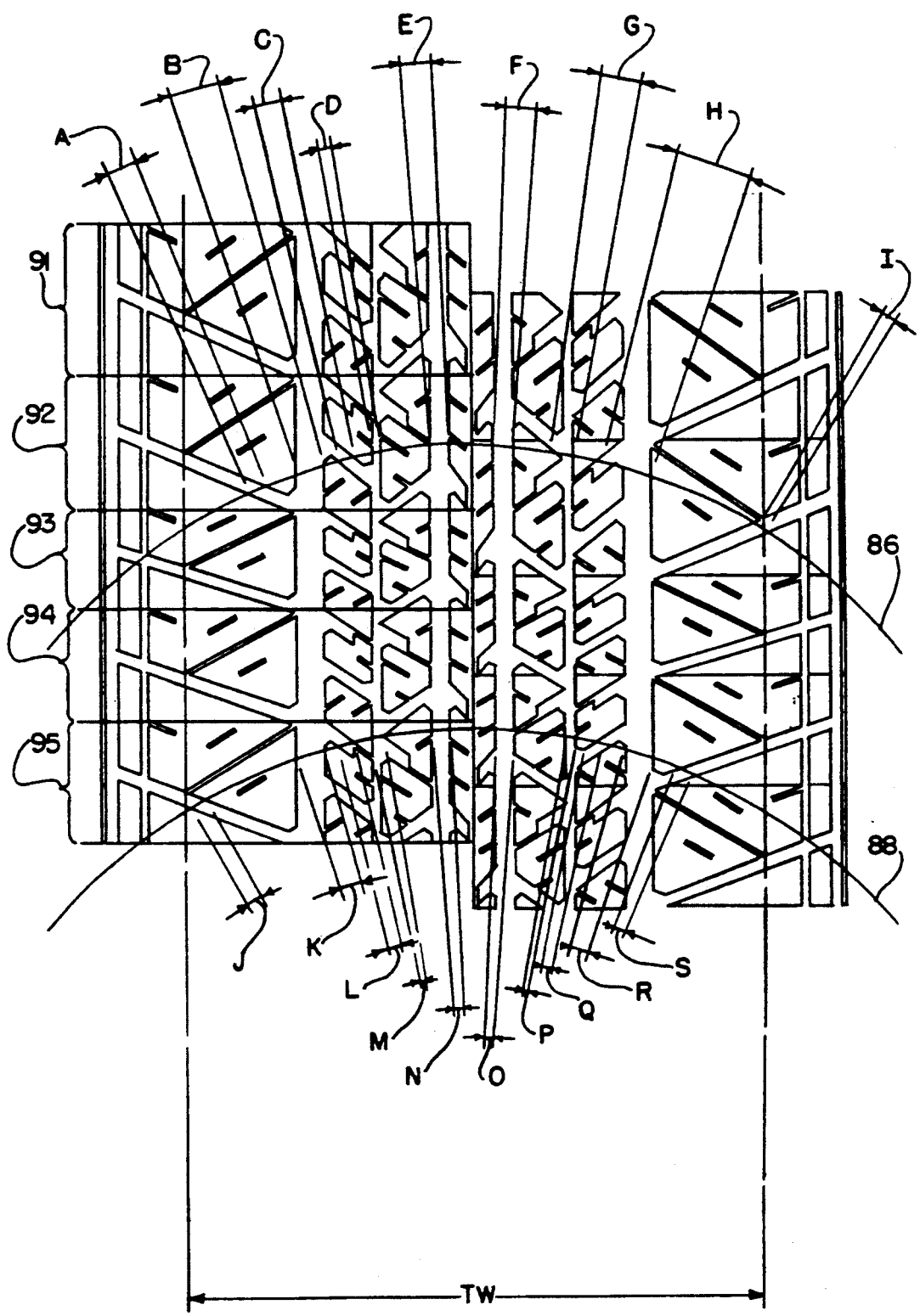
FIG. 1A is a partial plan view of a variable pitch tire tread based upon the tread pattern of FIG. 1.
Figure 5:
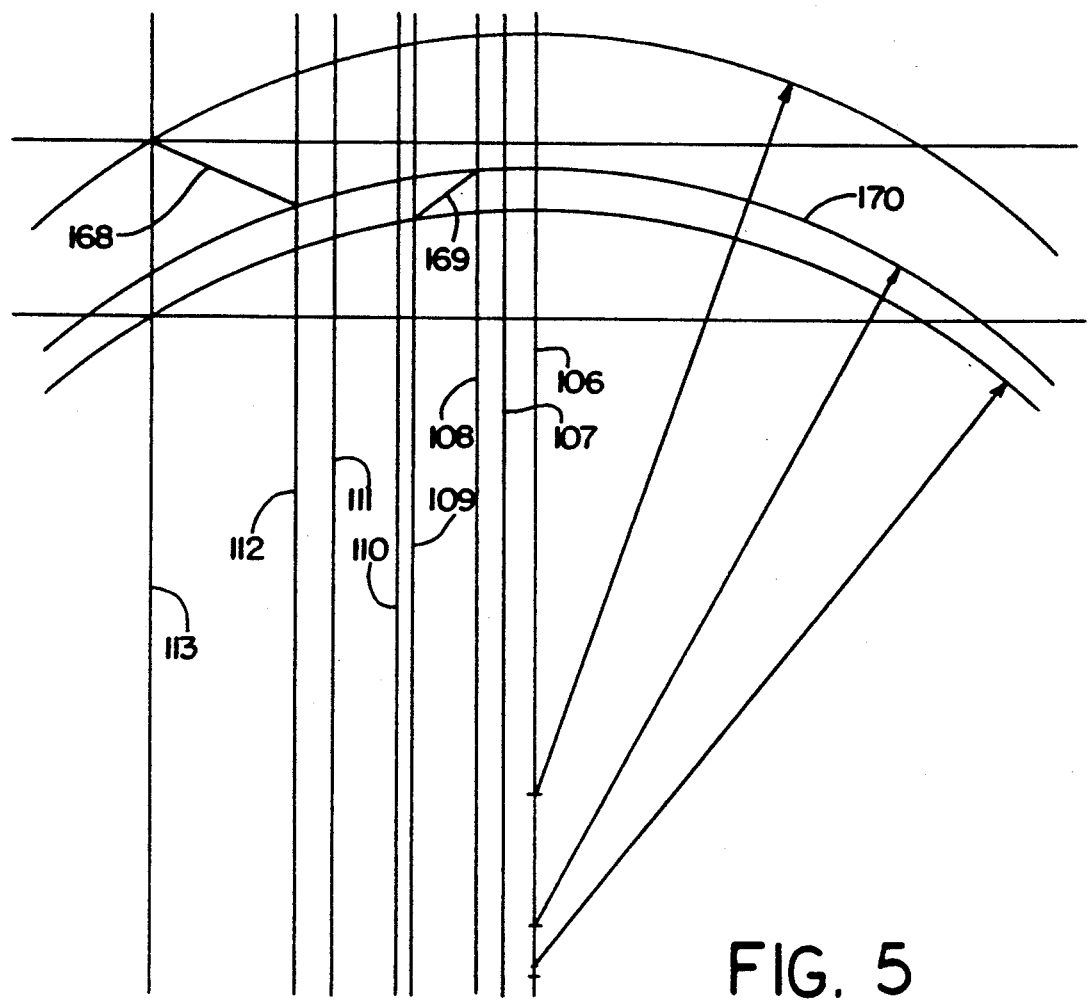

The grooves in the tread of FIG. 1 have been strategically placed so that the amount of groove void (i.e., void attributed to groove) across the leading edge of the footprint of the tire is substantially uniform about the circumference of the tire. This is illustrated in FIG. 1A wherein reference numerals 86 and 88 indicate two projections of the tire's leading edge that have been drawn at arbitrarily selected locations. The sum of the groove void (A+B+C+D+E+F+G+H+I) along projection 86 is substantially equal to the sum of groove void (J+K+L+M+N+O+P+Q+R+S) along projection 88. The groove void is "substantially constant" or "substantially uniform" if the standard deviation of the groove void around the circumference of the tire is no greater than about 7.5% of the mean value of groove void measured across the leading/trailing edge of the footprint around the circumference of the tire, although preferably the standard deviation is no greater than about 7.0% of the mean, more preferably no greater than about 6.5% of the mean and still more preferably no greater than about 6% of the mean. Some variation will normally have to be tolerated to accommodate other noise treatments and other design requirements and concerns such as mileage, wet traction, dry traction, snow traction, handling and/or appearance characteristics. For example, it can be seen in FIG. 1A that design cycles 91-95 have different pitch lengths for spreading the acoustic energy produced by tread impact noise over a broad frequency spectrum. In the illustrated preferred embodiment the mean values of groove void and solid measured across the leading edge is about 33% and 67%, respectively; and the standard deviation of groove void around the circumference of the tire is about 2% or about 6% of the mean, with a coefficient of kurtosis of about 3.

Having described a preferred embodiment of a tire tread construction for a pneumatic vehicle tire according to the invention, the method of the invention will now be described. The preferred method involves the strategic placement of void so that the amount of void across the leading edge of the footprint of the tire is substantially balanced, i.e., substantially uniform about the circumference of the tire. One might accomplish this by trial and error, but such approach would be extremely time consuming when generating a tread design for a tire having a footprint that has a non-linear leading and trailing edge that may be of regular arcuate or irregular arcuate shape. The term "regular arcuate" herein means an arc of constant radius from a point along the center line of the tread (a line midway between and parallel to the tread edges and coincident with the mid-circumferential center plane of the tire). The term "irregular arcuate" herein means an arc or profile line that varies in spacing from a point along the center line of the tread but which is not straight and parallel to the axis of the tire.

In accordance with a preferred method according to the invention, a balancing of the void in a tread design may be relatively easily and assuredly accomplished by applying the drawing technique illustrated in FIGS. 2-11. This preferred drawing technique is based on the laying-out of grooves in a design cycle such that each groove commences on a projection of the tire's leading edge at which another one of the grooves of substantially equal or equivalent width terminates. This criteria may be integrated with other design criteria. For example, a tread designer may be contemplating a tread design similar to that shown in FIG. 1 and having an arcuate leading and trailing edge of a desired radius such as, for example, 6" for a tread width of 6.3". In FIG. 2 a design unit 103 of a desired pitch length is delimited by lines 104 and 105 extending transversely across the tires reference arc, i.e., the tread width. The desired widths and locations of the desired number of ribs are outlined by circumferentially extending lines 106-113 (vertical lines in FIG. 2). In this example the top and bottom (or left and right) halves of the tire's reference arc are intended to be reflections of one another. Accordingly, the grooves need only be laid out over one half of the tire's reference arc (TW/2).

In FIG. 2 the line 106 corresponds to the mid-circumferential center plane of the tire (center line of the tread) and bisects a center rib. Moving from right to left in FIG. 2, the lines 106 and 107 outline or delineate one half of a center rib 114, the lines 108 and 109 outline an inner intermediate rib 116, the lines 110 and 111 outline an outer intermediate rib 120 and the lines 112 and 113 outline a shoulder rib 124 up to the axial edge (line 113) of the tread. Consequently, lines 107 and 108 outline a circumferential center groove 128, lines 109 and 110 outline a circumferential intermediate groove 132 and lines 111 and 112 outline an circumferential outer groove 136.

A first line 137 representing an angled groove may then be placed in the design unit. For purposes of the present invention placement of the groove designating line 137 is arbitrary, although other design considerations such as mileage, traction, appearance and handling requirements may dictate a desired placement of this groove designating line, as well as other groove designating lines subject to the following constraints. In FIG. 2 this first line is selected to start at the intersection of the outer groove 136 with the leading end line 104 of the design unit 103. The groove representing line 137 is extended axially inwardly at a desired inclination to the center line 106 of the tread only part way across the width of the outer intermediate rib 120, this leading to the formation of a notch in the outer intermediate rib. As used herein a notch is a groove that has one end intersecting another groove and an opposite end terminating interiorly of a tread block element or rib.

The leading edge of the tire's footprint, in this case a circular arc 138, is projected on the trailing end of the first groove designating line 137. When positioning a second groove a line representing that groove must be started on this projection 138 of the leading edge. Like the first groove designating line 137, the second groove designating line 139 may take any shape and may end at any place within the design unit, as long as it is continuous. After the second groove designating line is 139 drawn, the leading edge shape is projected at 140 on the end of the second groove designating line 139. This procedure continues until the last groove designating line ends on the projected leading edge of the first groove designating line of a next design cycle. In this example a third groove designating line 141 has been drawn between leading edge projection lines 140 and 142 and a fourth groove designating line 143 has been drawn between leading edge projection lines 142 and 144. The last leading edge projection line 144 corresponds to the projected leading edge of the first groove of the next design cycle.

During this drawing process other concerns may be taken into consideration such as, for example, extending grooves only part way through a rib to form a notch or completely through the rib to form a cross slot. In the present example, the second groove designating line 139 extends from the intermediate circumferential groove 132 only part way into the rib 116 to form a notch; the third groove designating line 141 extends through the outer intermediate rib 120 from circumferential outer groove 136 to circumferential intermediate groove 132 to form a cross slot; and the fourth groove designating line 143 extends from the circumferential center groove 128 part way across the width of the center rib 114 to form a notch.

In FIG. 3 additional lines are added to define the trailing edges of the grooves. These additional lines 146-149 each are parallel and substantially equally spaced from respective ones of the groove representing lines 137, 139, 141 and 143, respectively. In this manner substantially equal width grooves 154-157 are defined.

Then in FIG. 4 the grooves are limited axially as by terminating any notches at a circumferentially extending end line. As seen in FIG. 4 the grooves 154, 155 and 157 corresponding to notches are terminated by circumferentially extending end lines 162-164 respectively.

Ideally, the widths of the grooves are modulated along their respective lengths in relation to the angle they form with the tire's leading edge to account for the effective widening of the groove at steeper angles relative to the leading edge, as would occur when moving axially outwardly across an arcuate leading edge. That is, the amount of void measured along the leading edge will be greater for a groove that intersects the leading edge at a lesser angle than a groove of the same width that intersects at a steeper angle. This variation may be tolerated or, if especially severe, the widths of the grooves may be modulated so that they have an effective equal width when measured across the leading edge. A straight angled groove extending oblique to an arcuate leading edge may progressively decrease in width moving axially outwardly from the center line of the tread.

In the foregoing procedure the groove designating lines were used to define the leading edge of the grooves. The groove designating lines may instead correspond, for example, to the trailing edge or the center line of the groove. In some instances it may be necessary for the drawn lines to designate the center lines of the grooves as when the grooves have a point of inflection at which the groove reverses its direction relative to a line perpendicular to the leading edge at the point of inflection. This avoids the problem of the groove designating line denoting the leading edge of the groove over one part of the groove and the trailing edge over another part of the groove. This problem could give rise to substantial variance in void at the beginning and end points of grooves unless appropriate adjustment is made.

Figure 6:
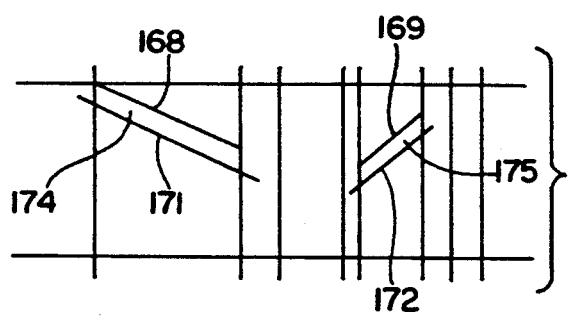
Figure 7:
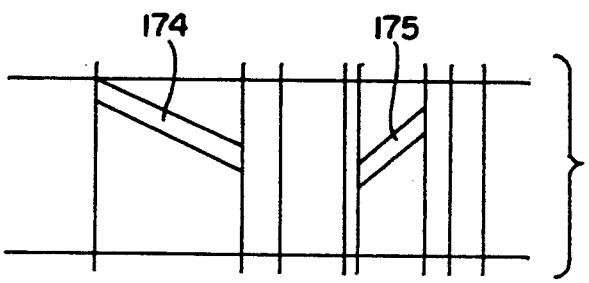

The foregoing steps may be repeated to generate a second sequence of grooves which may be included in the final design unit along with the first sequence illustrated in FIG. 4. In this example, the same procedure is followed to lay out fifth and sixth groove designating lines 168 and 169 in FIG. 5. As shown, the sixth groove designating line 169 commences on a projection 170 of the tire's leading edge at which the fifth groove designating line 168 terminates. Also, the sixth groove designating line 169 ends on the projected leading edge of the fifth groove designating line 168 of a next design cycle. In FIG. 6 additional lines 171 and 172 are added to define the trailing edges of grooves 174 and 175. Then, in FIG. 6 the grooves are limited axially in the manner previously described.

Figure 8:
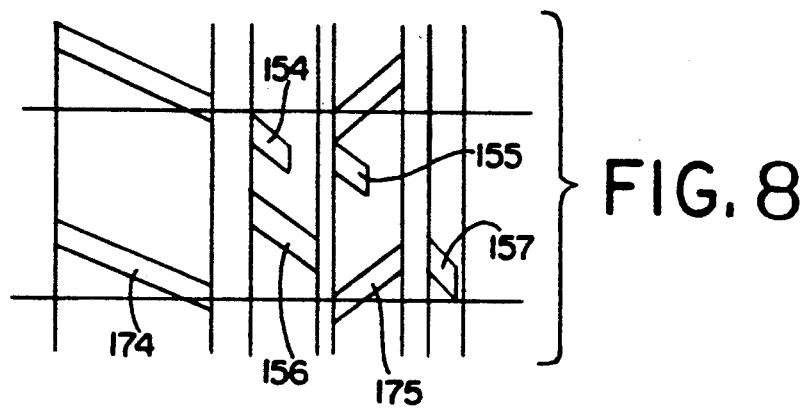

Additional sequences of groove may be laid out in the foregoing manner. In the present example only the foregoing two sequences are being used. FIG. 8 is an overlay of the first and second groove sequences of FIGS. 4 and 7 and FIG. 9 defines the groove design for one-half of the tread width, which half for the sake of discussion may be referred to as the top half arc.

As will be appreciated, two or more grooves may be disposed in side-by-side relationship to form a single wide groove in the finished tread design. Conversely, a single groove in the finished tread design may be represented during the drawing process by two or more grooves which may be laid out in the same or different sequences of groove.

Figure 9:
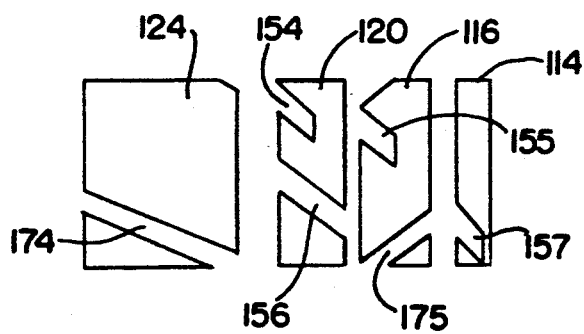
Figure 10:
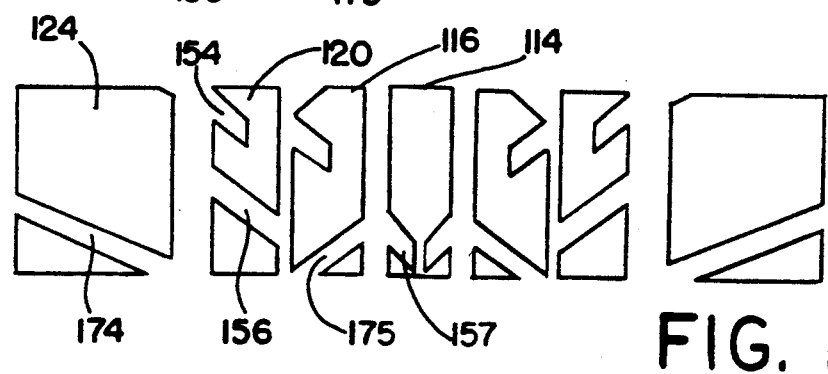
Figure 11:
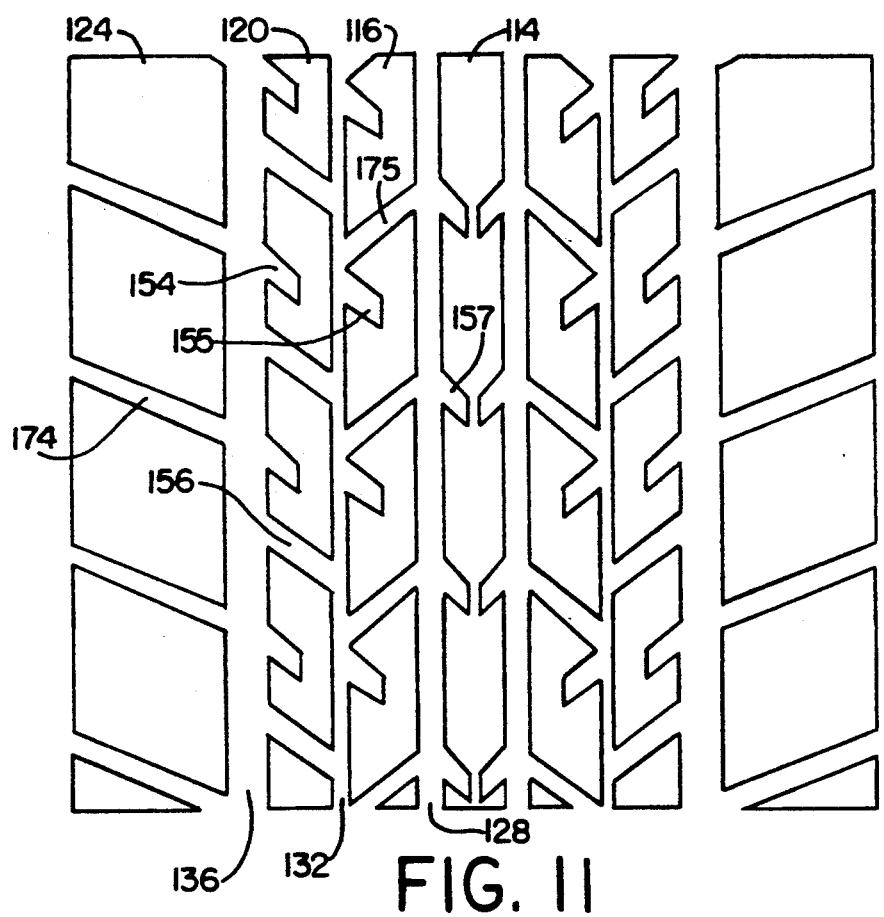

FIG. 10 shows the full design unit wherein the bottom half arc is a mirror image of the top half arc illustrated in FIG. 9. In FIG. 11 the design unit is repeated to form a composite that may be further refined. For example, the design unit can be proportioned in sequence like any normal design unit, but its groove void will always remain substantially balanced across the tire's leading edge. The top and bottom half arcs may be relatively rotated, for example, by one half the circumferential length of a design unit, as may be desired for considerations other than balanced groove void. The groove void, however, will remain balanced since it was balanced in each half arc.

After the basic design unit has been obtained in the foregoing manner, further refinements may be introduced into the design. For example, various sipes may be placed in the tread block elements. If desired, the sipe void may be balanced by applying the above-described drawing technique. In addition to the inclusion of sipes, further modifications may be made such as, for example, truncating one or more of the corners of the angled block elements. The additional void created by such truncation may impart some unbalance to the overall design but is relatively minor in relation to the overall area of void in the tread.

As may already be appreciated, the foregoing procedure gives rise to the tread construction shown in FIG. 1. The grooves 154, 155, 156, 157, 174 and 175 respectively correspond to the grooves 68, 56, 66, 44, 78 and 54. Moreover, the ribs 114, 116, 120 and 124 respectively correspond to the ribs 14, 16, 20 and 24; and the grooves 128, 132 and 136 respectively correspond to the grooves 28, 32 and 36. It can also be seen by comparing FIG. 1 to FIG. 11 that the top and bottom half arcs have been relatively rotated by one-half the pitch length of the design unit, thereby giving rise to the staggered relationship between the notches 44 and 45 in the center rib 14. As shown, various sipes have been placed in the tread block elements and several of the corners of the angled block elements have been truncated (chamfered).

Although the preferred drawing technique has been above described as applied to balance groove void as measured across the tire's leading edge, the technique may also be applied to balance void in relation to the trailing edge of the tire's footprint, which is accomplished in the same manner except that the tire rotates in the reverse direction. The drawing technique may also be applied to balance void in relation to both the leading and trailing edges, as would be desired for a non-directional tire, i.e., a tire that can be mounted to a rim for rotation in either direction. This latter task is facilitated by dividing the design unit into quadrants defined by the center line of the tread and an axial line bisecting the design unit. Grooves may be laid out in one quadrant such that they begin and end on the axial line bisecting the design unit, and then that quadrant may be rotated 180° into the diagonally opposite quadrant such that the diagonally opposite quadrants are symmetrical in relation to the center point of the design cycle. This may be repeated for the other two diagonally opposite quadrants to complete the design unit which will then have void balanced to both the leading and trailing edges.

From the foregoing it is believed that those familiar with the art will readily recognize and appreciate the novel concepts and features of the present invention. While the invention has been described in relation to only one embodiment, numerous variations, changes, substitutions and equivalents will present themselves to persons skilled in the art and may be made without necessarily departing from the scope and principles of this invention. As a result, the embodiment described herein is subject to various modifications, changes, and the like without departing from the scope and spirit of the invention, with the scope thereof being determined by reference to the claims appended hereto.

What is claimed is:

1. A pneumatic tire with a tread for engaging a road surface at a footprint having non-linear leading and trailing edges, the tread comprising a plurality of repeating design cycles placed continuously about the circumference of said tire, each said design cycle including a respective portion of a plurality of circumferential rows of tread block elements and transverse grooves defining the shape of said tread block elements, each of said grooves commencing on a projection of one of the leading and trailing edges at which a corresponding other one of said grooves of substantially equal width terminates, such that the void across said one of the leading and trailing edges is substantially balanced about the circumference of said tire, and wherein at least one of said grooves in each design cycle and its corresponding groove are located respectively in different said circumferential rows of tread block elements, and wherein the void across said one of the leading and trailing edges over each half arc of the tread is substantially balanced about the circumference of said tire.

2. A tire as set forth in claim 1, wherein each design cycle includes at least two sequences of grooves wherein within each sequence each succeeding groove commences on a projection of said one of the trailing and leading edges at which the preceding groove of substantially equal width in the same sequence terminates.

3. A tire as set forth in claim 1, wherein each said groove commences on a projection of the leading edge at which the corresponding groove of substantially equal width terminates.

4. A tire as set forth in claim 1, wherein each half arc of the tread is circumferentially rotated relative to the other half arc.

5. A tire as set forth in claim 1, wherein the pitch lengths of the design cycles are modulated about the circumference of the tire to spread acoustic energy produced by the tread over the audio frequency spectrum.

6. A tire as set forth in claim 1, wherein the grooves in at least one of said circumferential rows include grooves that are oppositely inclined to the mid-circumferential center plane of said tire with respect to one another.

* * * * *